United States Patent [19]

Parrish

[11] Patent Number: 4,508,588

[45] Date of Patent: Apr. 2, 1985

[54] SCRAPER FOR REMOVING LABELS OR THE LIKE

[76] Inventor: John T. Parrish, 14244 NE. 124th St., A-103, Kirkland, Wash. 98003

[21] Appl. No.: 523,647

[22] Filed: Aug. 15, 1983

[51] Int. Cl.[3] .............................................. B32B 31/18

[52] U.S. Cl. ................................ 156/584; 15/236 R; 30/169; 156/579

[58] Field of Search ......................... 15/236 A, 236 R; 30/169; 156/579, 584, 344

[56] References Cited

U.S. PATENT DOCUMENTS

| | | | |
|---|---|---|---|
| 3,040,802 | 6/1962 | Frazer | 156/584 |
| 3,818,592 | 6/1974 | Himeno | 30/169 X |
| 3,986,265 | 10/1976 | Cusato | 156/584 X |
| 4,067,107 | 1/1978 | Scafetta | 15/236 R X |
| 4,128,452 | 12/1978 | Johnson et al. | 156/584 |
| 4,248,660 | 2/1981 | Johnson | 156/579 |

*Primary Examiner*—Robert Dawson

*Attorney, Agent, or Firm*—Seed and Berry

[57] ABSTRACT

A scraper adapted to be mounted on the bottom of a labeling gun handle is provided. A scraper blade handle preferably faces forward to enable labels to be removed and applied in a two-stroke motion. The blade and/or receptacle for housing removed labels is preferably removable and discardable.

8 Claims, 7 Drawing Figures

FIG. 1
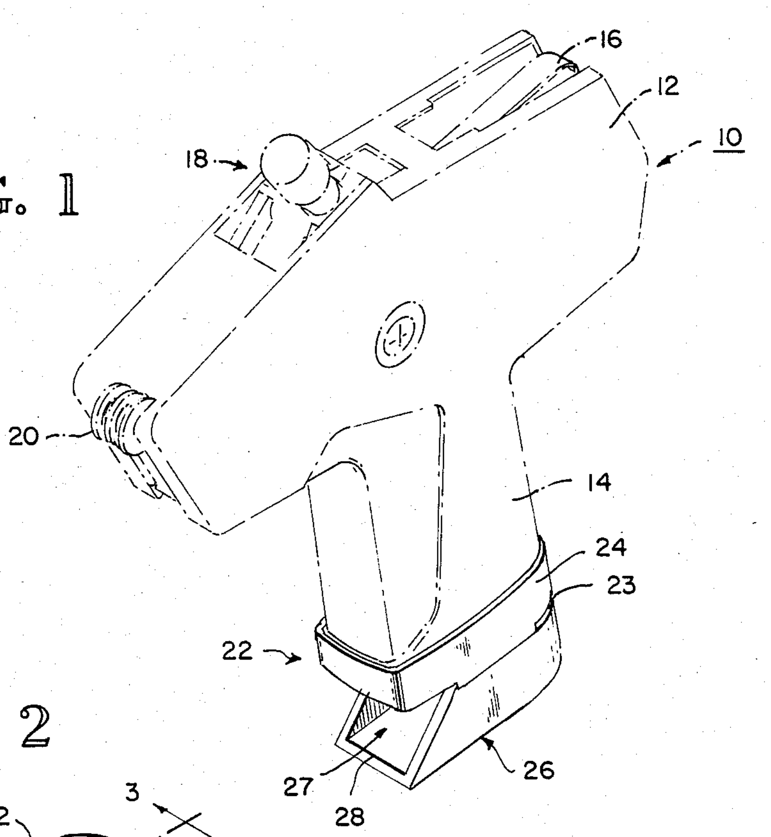
FIG. 2
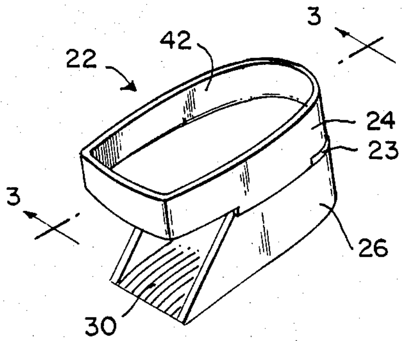
FIG. 3
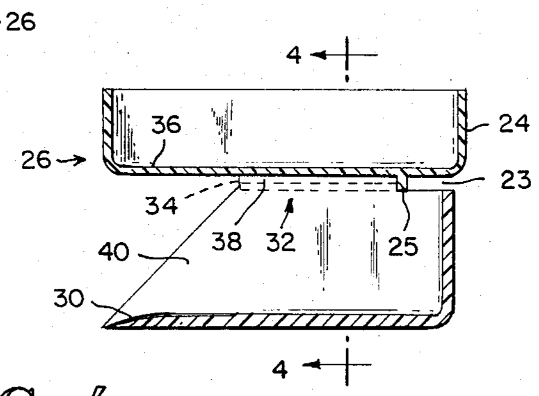
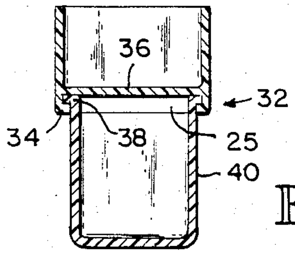
FIG. 4

SCRAPER FOR REMOVING LABELS OR THE LIKE

DESCRIPTION

1. Technical Field

This invention relates to a scraper for removing price labels, and more particularly, to such a scraper adapted for use with a labeling gun.

2. Background Art

Apparatus known as "labeling guns" are often used by retailers, such as grocers, to apply pricing labels to products. These guns include a main body portion and a handle portion which depends therefrom. The main body portions houses a roll of blank labels which can be individually advanced through a price-stamping means to the forward projecting end of the gun where they are discharged for attachment to an item of stock. The handle houses a trigger for advancing the labels such that when the handle is squeezed inwardly, the labels are advanced so that the forwardmost label projects beyond the main body and can be readily applied to the item to be priced. The trigger also actuates the pricing means to stamp an advancing label with a preset price. A pricing gun thus enables its user to set a desired price, hold the gun in one hand and stamp a plurality of items with the desired price, leaving the other hand free to pick up and set down the items to be stamped as necessary.

When putting new price labels on previously labeled items, it is desirable to also remove the old label. Placing the new label on top of the old label is generally considered to be bad merchandising. It alerts the consumer to a change in price and may lead the consumer to believe that the retailer's stock is old or stale. Additionally, consumers may peel off the old label and attempt to purchase at an incorrect price.

Consequently, when relabeling goods, it is generally necessary to scrape off the old label. A number of existing scrapers have been designed for this purpose, such as the scrapers disclosed in U.S. Pat. Nos. 4,128,452 and 4,248,660. Each of these scrapers includes a scraping blade mounted to a handle to enable the user to hold the scraper by the handle and peel off a label with the blade.

As disclosed in U.S. Pat. No. 4,248,660, scraper blades are preferably fabricated of self-lubricating plastic material so that labels do not adhere to the blade after they are removed from the merchandise. Blades fabricated of such material eliminate the need for separate lubricating apparatus, such as the one disclosed in U.S. Pat. No. 4,128,452.

While such scrapers function well to peel off a label, they have several disadvantages. First, in order to peel and relabel a given item during a single operation, a person must either use two hands or switch tools in one hand. Using two hands is undesirable because it leaves no hand free to move the merchandise being labeled. Switching tools is undesirable because it is relatively slow and awkward.

The second disadvantage of such scrapers is that they do not store well. When not in use, the scraper must be stored. If a sheath is used for storage, the user must carry the sheath at all times and take the time during use to insert and withdraw the blade from the sheath. Scrapers having no sheath are undesirable in that they must be stored with the blade exposed, often resulting in either torn pockets or nicked fingers.

Another disadvantage of these scrapers is that they provide no means to collect the labels after they are peeled off. Consequently, after relabeling goods, it is often necessary to rescrape the peeled labels from surrounding surfaces, such as floors or display counters.

DISCLOSURE OF INVENTION

It is an object of this invention to provide a scraper for use with a labeling gun which will enable both the scraper and labeling gun to be used with a single hand.

It is another object of this invention to provide such a scraper which, in a preferred embodiment, includes a disposable blade portion.

It is another object of this invention to provide such a scraper which includes means for collecting labels after they are peeled off of a product.

These and other objects which will become more apparent as the invention is more fully described below are obtained by providing a scraper which can be mounted beneath the handle of a labeling gun such that the blade faces forward. This arrangement enables the user of the gun to hold an item of merchandise in one hand, peel off an old label by pivoting the gun in a first direction such that the handle moves upwardly and the blade engages and removes the old label, and then pivot the gun back toward its original position, pulling the trigger and applying a new label en route. A reciprocating two-stroke motion may thus be employed to rapidly peel off old labels and apply new ones.

Preferred embodiments include a detachable and replaceable blade and receptacle combination or, in alternate embodiments, a replaceable receptacle. In another alternate embodiment, the scraper blade is integrally formed with the handle of a labeling gun.

BRIEF DESCRIPTION OF THE DRAWINGS

FIG. 1 is an isometric view of a first preferred embodiment of the invention mounted on the bottom of a labeling gun handle.

FIG. 2 is an isometric view of a second preferred embodiment of the invention having a serrated blade.

FIG. 3 is a cross-sectional view of the embodiment of FIG. 2 taken through line 3—3.

FIG. 4 is a cross-sectional view of the preferred embodiment of FIG. 3 taken through line 4—4 of FIG. 3.

BEST MODE FOR CARRYING OUT THE INVENTION

Figure 5:
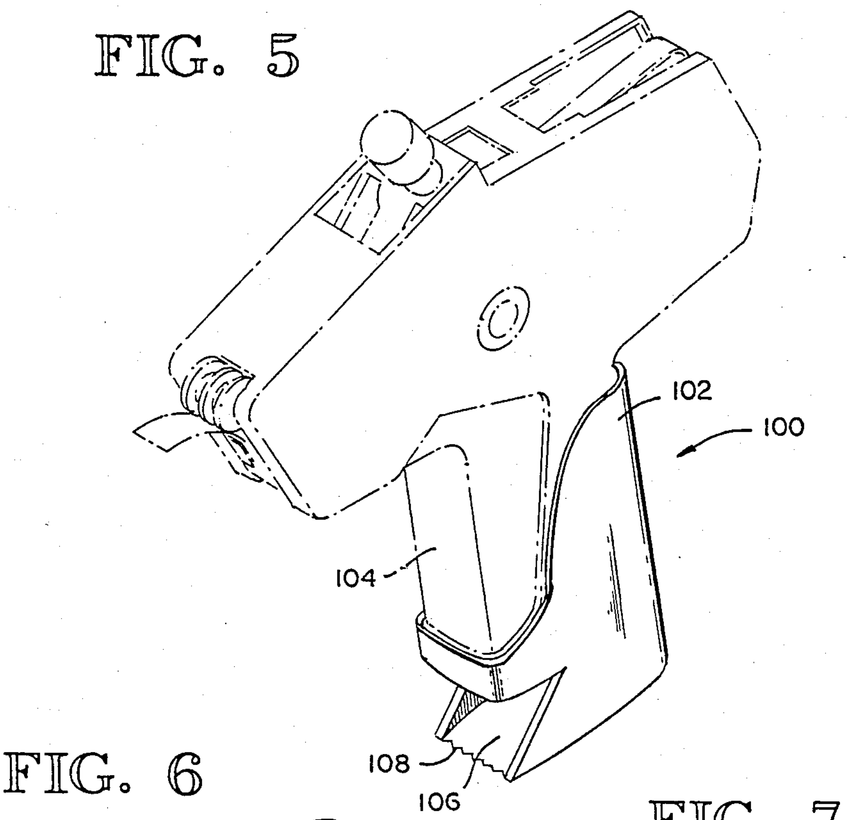
FIG. 5 is an isometric view of third preferred embodiment of the invention having a raised base portion.

In various embodiments, the scraper of this invention comprises a scraper blade which is mounted on the bottom of a labeling gun handle. In preferred embodiments, the scraper includes a receptacle for catching labels after they have been removed. The scraper of this invention enables the user of a labeling gun to hold an item in one hand, and with the gun in the other hand, remove a label with one motion and apply a new label with a second motion.

As seen in FIG. 1, a scraper 22 comprises an upper piece 24, which is fitted onto the handle of the labeling gun, and a lower piece, which is removably mounted on the upper piece. The lower piece includes a blade 28 on the front thereof for scraping off labels and receptacle 27 positioned therebehind to receive and store labels after scraping. In operation, the user holds the labeling gun by its handle and lines up the scraper blade with the label to be removed. The gun is then pushed, or pivoted, into the label to remove it. The label will pass over the blade and into the receptacle.

It is preferred that the blade and receptacle be fabricated of self-lubricating plastic material to prevent scraped labels from sticking to the blade. The upper piece may be fabricated of any material desired. When the receptacle is full or the blade worn, the lower portion may be removed from the top piece and replaced with a new lower piece.

In the preferred embodiments illustrated in FIGS. 3 and 4, a tracked connection 32 is employed on each side of the scraper to enable the lower piece to be slidably removed from the upper piece (see FIG. 4). Channel members 34 depend from the bottom 36 of the upper piece to form a slot. The sides 40 of the lower piece include a top flange portion 38 which projects outwardly and is slidably received in the slot formed by the channel members 34. The embodiments illustrated herein are designed to allow the bottom piece to be slid rearwardly onto the top piece. Consequently, a stop member 25 depends from the bottom of the upper piece to prohibit further rearward movement of the lower piece once is its properly aligned. As seen in FIG. 3, the tracked connection extends rearwardly to the location of the stop member. A cutout portion 23 is positioned rearward of the track connection to provide a passageway for the lower piece over the stop member.

As best seen in FIG. 2, the upper piece 24 has a hollow main body defined by interior walls 42 which are shaped correspondingly to the exterior of the gun handle. The top piece may thus be snapped into place. Alternate embodiments, such as the one disclosed in FIG. 7 and described below, eliminate the interior walls and provide apertures which enable the upper piece to be screwed into the handle of the labeling gun.

Figure 6:
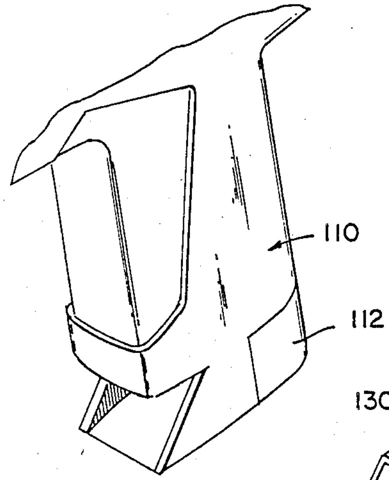
FIG. 6 is a preferred embodiment of the invention wherein the scraper is integrally formed with the handle of the pricing gun and includes a removable receptacle.

Scrapers in accordance with the present invention may employ a variety of scraping blades. A planar blade (as shown in FIG. 1), a convex blade 118 (such as is shown in FIG. 6), a serrated blade 30 (as shown in FIG. 2), or a serrated-edged blade 108 (such as shown in FIG. 5) may be used interchangeably in any of the embodiments. For embodiments having removable blades, replacement blades of various configurations may be selected as desired for a particular use. Other blade shapes, such as the shape disclosed in U.S. Pat. No. 4,248,660, may be employed, if desired. It is not intended that the scraper of this invention be limited to any particular blade configuration.

FIG. 5 illustrates a scraper 100 comprising an alternative preferred embodiment of the invention. The scraper comprises a single piece which snaps over the gun handle. A raised back portion 102 extends up the rear of the handle of the gun to aid in holding the scraper in place without interfering with the action of the trigger 104. The blade 106 includes a serrated front edge 108.

FIG. 6 discloses another alternate embodiment wherein the scraper blade 118 is integrally formed with the handle 110 of the labeling gun. A removable receptacle member 112 is positioned rearwardly of the blade and may be mounted using a tracked arrangement such as disclosed in FIGS. 3 and 4.

The embodiments disclosed in FIGS. 5 and 6 could include, of course, features of the embodiments disclosed in FIGS. 1-4. For example, in FIG. 6, the handle and upper piece could comprises one integrally formed piece to which a bottom piece, such as disclosed in FIG. 1, is attached using the tracked connection disclosed herein. A similar arrangement could also be employed in the embodiment disclosed in FIG. 4. In such an arrangement, the upper piece would then have a raised handle.

Figure 7:
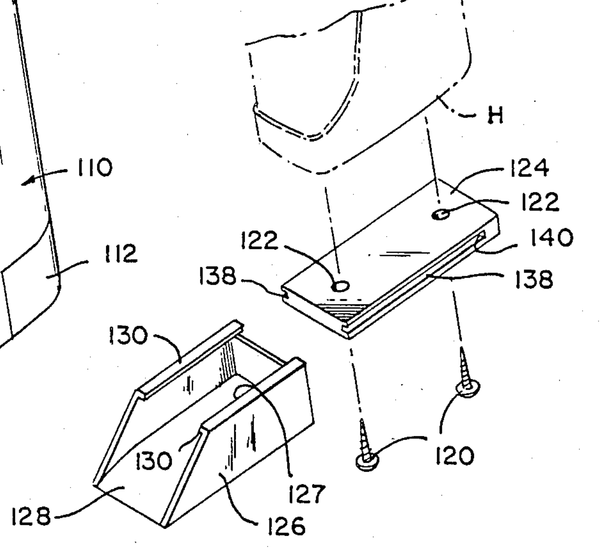
FIG. 7 is an alternate preferred embodiment of the invention utilizing an upper piece which screwed into the handle of a labeling gun.

An embodiment of the present invention which employs an upper piece 124 which is screwed into the bottom of a labeling gun handle H is illustrated in FIG. 7. The upper piece essential comprises a flat rectangular solid. Screws 120 extend through apertures 122 positioned on the bottom piece. Many existing labeling guns include an aperture (not shown) in the bottom thereof which are preferably used to receive the screws. A lower piece 126 includes a blade 128 and receptacle 127 positioned therebehind. The lower piece mounts onto the top piece by sliding a pair of inwardly projecting top flanges into corresponding receiving slots 138 on the sides of the top piece. The back end of the receiving slots form stops 140 for terminating the rearward movement of the bottom piece.

Although the invention has been described herein with reference to particular embodiments, it is not intended that the invention be limited to these particular embodiments, but rather than the invention include all equivalent embodiments which are within the spirit of the invention.

I claim:

1. An apparatus for use in conjunction with a labeling gun which has a handle depending from a main body portion, the apparatus functioning to scrape labels off surfaces to which they have been previously applied, the apparatus comprising:

- an upper piece including means for mounting the upper piece to the bottom of the handle of a labeling gun; and
- a lower piece removably mounted on the upper piece, the lower piece including a blade which forms one leading edge therof.

2. The apparatus of claim 1, further including a receptacle mounted on the lower piece adjacent the blade for receiving labels after they are removed by the blade.

3. The apparatus of claim 1 wherein the mounting means comprises a hollow open-ended chamber, the chamber defined by a sidewall which is shaped correspondingly to the lower portion of the handle of the labeling gun.

4. The apparatus of claim 3 wherein the sidewall extends upwardly along the rear of the handle to a location near the main body portion of the labeling gun, thereby enabling the user of the labeling gun to engage the upper piece when holding the gun.

5. The apparatus of claim 1 wherein the upper piece is a rectangular solid and the mounting means comprises fastening which extend upwardly through the upper piece and into the handle of the labeling gun.

6. A labeling gun of the type comprising a main body portion which houses and dispenses labels and a handle portion which depends therefrom, the improvement comprising: a scraper mounted to the lower portion of the handle, the scraper including a blade positioned on the leading edge thereof to enable the user of the gun to apply and remove labels with a two stroke motion.

7. The labeling gun of claim 6, the improvement further comprising a receptacle for storing labels after the labels are removed by the blade, the receptacle being adjacent the blade.

8. The labeling gun of claim 7 wherein the receptacle is removably mounted on the labeling gun.

* * * * *